(12) United States Patent
Kim et al.

(10) Patent No.: US 11,522,258 B2
(45) Date of Patent: Dec. 6, 2022

(54) ELECTROLYTE REMOVING DEVICE, APPARATUS AND METHOD FOR MANUFACTURING SECONDARY BATTERY COMPRISING THE SAME, AND SECONDARY BATTERY

(71) Applicant: LG Chem, Ltd., Seoul (KR)

(72) Inventors: Seok Jin Kim, Daejeon (KR); Sang Hyun Koo, Daejeon (KR); Cha Hun Ku, Daejeon (KR)

(73) Assignee: LG Energy Solution, Ltd.

( * ) Notice: Subject to any disclaimer, the term of this patent is extended or adjusted under 35 U.S.C. 154(b) by 210 days.

(21) Appl. No.: 16/614,201

(22) PCT Filed: Oct. 17, 2018

(86) PCT No.: PCT/KR2018/012302
§ 371 (c)(1),
(2) Date: Nov. 15, 2019

(87) PCT Pub. No.: WO2019/124704
PCT Pub. Date: Jun. 27, 2019

(65) Prior Publication Data
US 2021/0036302 A1    Feb. 4, 2021

(30) Foreign Application Priority Data

Dec. 18, 2017 (KR) .......................... 10-2017-0174152

(51) Int. Cl.
*H01M 50/691* (2021.01)
*H01M 10/04* (2006.01)
(Continued)

(52) U.S. Cl.
CPC ..... *H01M 50/691* (2021.01); *H01M 10/0404* (2013.01); *H01M 50/10* (2021.01);
(Continued)

(58) Field of Classification Search
CPC .......... H01M 50/691; H01M 10/0404; H01M 50/10; H01M 50/60; H01M 50/30; Y02P 70/50
See application file for complete search history.

(56) References Cited

U.S. PATENT DOCUMENTS

| 2,981,453 A * | 4/1961 | Kinzelman | B05C 9/08 226/23 |
| 2002/0106555 A1* | 8/2002 | Langan | H01M 50/129 29/730 |

(Continued)

FOREIGN PATENT DOCUMENTS

| CN | 103354961 A | 10/2013 |
| JP | 2001151399 A | 6/2001 |

(Continued)

OTHER PUBLICATIONS

International Search Report for Application No. PCT/KR2018/012302, dated Jan. 18, 2019, pp. 1-2.

(Continued)

*Primary Examiner* — Matthew T Martin
*Assistant Examiner* — Jessie L. Walls
(74) *Attorney, Agent, or Firm* — Lerner, David, Littenberg, Krumholz & Mentlik, LLP (57) ABSTRACT

The present invention relates to an electrolyte removing device. The electrolyte removing device comprises: a jig assembly configured to receive in a seated position a pouch comprising an accommodation part in which an electrode assembly is accommodated, a gas pocket part, and a connection part connecting the accommodation part to the gas pocket part; and an electrolyte removing assembly configured to push an electrolyte remaining on the connection part to the gas pocket part to remove the electrolyte from the connection part.

10 Claims, 9 Drawing Sheets

(51) Int. Cl.
  *H01M 50/30* (2021.01)
  *H01M 50/60* (2021.01)
  *H01M 50/10* (2021.01)

(52) U.S. Cl.
  CPC ........... *H01M 50/30* (2021.01); *H01M 50/60* (2021.01); *Y02P 70/50* (2015.11)

(56) References Cited

U.S. PATENT DOCUMENTS

| | | | | |
|---|---|---|---|---|
| 2009/0253038 | A1* | 10/2009 | Segawa | ............ H01M 10/0585 |
| | | | | 429/210 |
| 2013/0244095 | A1 | 9/2013 | Min et al. | |
| 2015/0037663 | A1 | 2/2015 | Uhm et al. | |
| 2016/0308181 | A1 | 10/2016 | Kato et al. | |
| 2017/0025702 | A1 | 1/2017 | Jung et al. | |
| 2017/0125787 | A1* | 5/2017 | Ryu | ................... H01M 50/636 |

FOREIGN PATENT DOCUMENTS

| | | | | |
|---|---|---|---|---|
| JP | 2006040747 | A | | 2/2006 |
| KR | 101334623 | B1 | | 11/2013 |
| KR | 20140018695 | A | | 2/2014 |
| KR | 101381820 | B1 | | 4/2014 |
| KR | 20150062849 | A | * | 6/2015 ........ H01M 10/0565 |
| KR | 20150062849 | A | | 6/2015 |
| KR | 20150072019 | A | | 6/2015 |
| KR | 20160040087 | A | | 4/2016 |
| KR | 101627357 | B1 | | 6/2016 |
| KR | 20160086376 | A | | 7/2016 |
| KR | 101713068 | B1 | | 3/2017 |
| KR | 20170082811 | A | | 7/2017 |

OTHER PUBLICATIONS

Search Report from Chinese Application No. 201880029716.0 dated Sep. 13, 2021. 2 pgs.

* cited by examiner

ELECTROLYTE REMOVING DEVICE, APPARATUS AND METHOD FOR MANUFACTURING SECONDARY BATTERY COMPRISING THE SAME, AND SECONDARY BATTERY

CROSS-REFERENCE TO RELATED APPLICATION

The present application is a national phase entry under 35 U.S.C. § 371 of International Patent Application No. PCT/KR2018/012302, filed on Oct. 17, 2018, published in Korean, which claims priority from Korean Patent Application No. 10-2017-0174152, filed on Dec. 18, 2017, the disclosures of which are hereby incorporated by reference in their entireties.

TECHNICAL FIELD

The present invention relates to an electrolyte removing device, an apparatus and method for manufacturing a secondary battery comprising the same, and a secondary battery, and more particularly, to an electrolyte removing device that removes an electrolyte remaining on a connection part connecting an electrode assembly accommodation part and a gas pocket part to improve sealability of the connection part, an apparatus and method for manufacturing a secondary battery comprising the same, and a secondary battery.

BACKGROUND ART

In general, secondary batteries are chargeable and dischargeable unlike primary batteries that are not chargeable and are widely used in electronic devices such as mobile phones, notebook computers, camcorders, and the like, electric vehicles, or the like.

Such a secondary battery comprises an electrode assembly and a pouch accommodating the electrode assembly, and the electrode assembly has a structure in which a plurality of electrodes and a plurality of separators are alternately laminated. Also, the pouch comprises an accommodation part accommodating the electrode assembly, a gas collection part collecting a gas generated in the accommodation part, and a connection part connecting the accommodation part to the gas collection part.

A method for manufacturing the secondary battery having the above-described configuration comprises a step of preparing an electrode assembly, a step of accommodating the prepared electrode assembly and an electrolyte into an accommodation part of a pouch to seal the accommodation part, thereby manufacturing the secondary battery, a step of charging/discharging the secondary battery to activate the secondary battery, a step of discharging the gas generated in the accommodation part during the step of activating the secondary battery to the outside through a gas pocket part, and a step of sealing the connection part to complete the secondary battery.

However, in the secondary battery, while the gas generated in the accommodation part moves to the gas pocket part, a portion of the electrolyte contained in the gas may remain on the connection part. Therefore, the connection part may be significantly deteriorated in sealability due to the electrolyte remaining on the connection part.

DISCLOSURE OF THE INVENTION

Technical Problem

The present invention has been made to solve the above problems, and thus, an object of the present invention is to provide an electrolyte removing device that removes an electrolyte remaining on a connection part of a pouch to improve sealability of the connection part, an apparatus and method for manufacturing a secondary battery comprising the same, and a secondary battery.

Technical Solution

To achieve the above object, an electrolyte removing device according to a first embodiment of the present invention comprises: a jig assembly configured to receive in a seated position a pouch comprising an accommodation part in which an electrode assembly is accommodated, a gas pocket part, and a connection part connecting the accommodation part to the gas pocket part; and an electrolyte removing assembly configured to push an electrolyte remaining on the connection part to the gas pocket part to remove the electrolyte from the connection part, wherein the electrolyte removing assembly comprises: a guide member configured to flatten the connection part without being folded while the guide member is moved to the gas pocket part in a state of pressing the connection part; an electrolyte removing member configured to push the electrolyte remaining on the connection part to the gas pocket part to remove the electrolyte from the connection part while the electrolyte removing member is moved to the gas pocket part in a state of pressing the connection part that is flattened by the guide member; and a moving member configured to move the guide member and the electrolyte removing member from the connection part to the gas pocket part.

The moving member may comprise: a fixed body; and a movable cylinder coupled to the fixed body, the movable cylinder configured to horizontally translate the guide member and the electrolyte removing member from the connection part to the gas pocket part.

The guide member may comprise: a first cylinder configured to horizontally translate from the connection part to the gas pocket part due to motion of the movable cylinder; and a guide part configured to press on the connection part, the first cylinder configured to vertically translate the guide part into contact with the connection part, the movable cylinder configured to horizontally translate the guide part and the first cylinder together from the connection part to the gas pocket part to flatten the connection part.

The guide part may comprise: an upper guide plate coupled to the first cylinder; a lower guide plate configured to vertically translate relative to the upper guide plate to come into surface contact with the connection part to flatten the connection part without being folded; and a coupling part coupled to the lower guide plate and the upper guide plate.

An upper portion of the lower guide plate may be configured to overlap a lower portion of the upper guide plate.

A long vertical hole is defined in the lower guide plate, the long vertical hole overlapping the upper guide plate, and a coupling bolt passing through the long hole and coupled to the upper guide plate so that the upper guide plate and the lower guide plate may be coupled to each other.

The coupling part may comprise: a fixing piece provided on the upper guide plate; and a fixing bolt passing through the fixing piece and coupled to the lower guide plate, wherein the lower guide plate may be configured to vertically descend or ascent by respectively loosening or tightening the fixing bolt to adjust a vertical distance between the connection part and the lower guide plate.

The electrolyte removing member may comprise: a second cylinder coupled to the guide member, the second cylinder configured to horizontally translate from the connection part to the gas pocket part due to motion of the movable cylinder; and a pressing piece configured to press on the connection part, the second cylinder configured to vertically translate the pressing piece into contact with the connection part, the movable cylinder configured to horizontally translate the pressing piece and the second cylinder together to push the electrolyte remaining on the connection part to the gas pocket part, thereby removing the electrolyte from the connection part.

The pressing piece may comprise: a pressing part coupled to the second cylinder; a roller part comprising a pressing roller rotationally coupled to the pressing part and configured to come into rolling contact with the connection part; and a hinge shaft coupling the roller part to the pressing part, wherein the roller part may be configured to rotate around the hinge shaft.

The jig assembly may comprise: a fixing jig; and a seating jig which is coupled to a top surface of the fixing jig, the seating jig being configured to receive the pouch in the seated position, wherein the seating jig may comprise: a fixing piece coupled to the top surface of the fixing jig; and a seating piece having elastic restoring force, the seating piece being disposed on a top surface of the fixing piece.

The fixing jig may comprise: a lower support plate; an upper support plate which is disposed above the lower support plate and to which the seating jig is coupled; and a height-adjusting part disposed between the lower support plate and the upper support plate, the height-adjusting part being configured to adjust a distance between the lower support plate and the upper support plate.

An apparatus for manufacturing a secondary battery according to a second embodiment of the present invention comprises: a transfer device configured to transfer a pouch comprising an accommodation part in which an electrode assembly is accommodated, a gas pocket part, and a connection part connecting the accommodation part to the gas pocket part; an electrolyte removing device configured to push an electrolyte remaining on the connection part of the pouch to the gas pocket part to remove the electrolyte from the connection part, the transfer device being configured to transfer the pouch to the electrolyte moving device; a sealing device configured to seal the connection part of the pouch after removal of the electrolyte by the electrolyte removing device; and a discharge device configured to discharge the pouch from the apparatus after the connection part is sealed by the sealing device.

A method for manufacturing a secondary battery according to the second embodiment of the present invention comprises: (a) a step of transferring a pouch to an electrolyte removing device, the pouch comprising an accommodation part in which an electrode assembly is accommodated, a gas pocket part, and a connection part connecting the accommodation part to the gas pocket part; (b) a step comprising a first process of seating the pouch in the electrolyte removing device and a second process of pushing an electrolyte remaining on the connection part of the pouch to the gas pocket part to remove the electrolyte from the connection part; (c) a step of sealing the connection part of the pouch, after the electrolyte is removed therefrom, the sealing being performed by a sealing device; and (d) a step of discharging the pouch from the sealing device after the connection part is sealed, wherein, in the second process, during the pushing of the electrolyte, the connection part is flattened without being folded while a guide member of the electrolyte removing device moves from the connection part to the gas pocket part in a state of being pressed against the connection part, and the electrolyte remaining on the connection part is pushed from the connection part to the gas pocket part.

A secondary battery according to a third embodiment of the present invention comprises a pouch comprising an accommodation part in which an electrode assembly is accommodated, a gas pocket part, and a connection part connecting the accommodation part to the gas pocket part, wherein the connection part contains a seal that is configured to prevent fluid communication between the accommodation part and an interior of the gas pocket part, the seal being devoid of any electrolyte.

Advantageous Effects

The electrolyte removing device according to the present invention may comprise the jig assembly and the electrolyte removing assembly. The electrolyte removing assembly may comprise the guide member, the electrolyte removing member, and the moving member. As a result, the electrolyte remaining on the connection part connecting the electrode assembly accommodation part of the pouch to the gas pocket part may be effectively removed. Thus, the connection part may be completely sealed to prevent the sealing defects from occurring.

Particularly, the electrolyte removing device according to the present invention may fix the connection part through the guide member and also spread the connection part without being folded. Thus, the electrolyte remaining on the connection part may be more completely removed.

The moving member according to the present invention may comprise the fixed body and the movable cylinder. Thus, the guide member and the electrolyte removing member may effectively move from the connection part to the gas pocket part. Therefore, the electrolyte remaining on the connection part may be pushed to the gas pocket part and then completely removed.

The guide member according to the present invention may comprise the first cylinder and the guide part. Thus, the connection part may be fixed and also spread without being folded.

The guide part according to the present invention may comprise the upper guide plate, the lower guide plate, and the coupling part. Thus, the guide part may be reused by replacing only the lower guide plate that presses the connection part to achieve the ease of the maintenance. Particularly, the lower guide plate according to the present invention may come into surface contact with the connection part. Thus, the contact force between the connection part and the lower guide plate may increase to stably spread the connection part without being folded.

The upper guide plate and the lower guide plate according to the present invention may partially overlap each other. Thus, the coupling force and the adhesion force between the upper guide plate and the lower guide plate may increase.

The long hole may be defined in the lower guide plate overlapping the upper guide plate, and the coupling bolt coupled to the upper guide plate through the long hole may be provided. Thus, the coupling force between the upper guide plate and the lower guide plate may increase.

The coupling part according to the present invention may comprise the fixing piece and the fixing bolt. When the fixing bolt is loosened or tightened, the lower guide plate may descend toward the connection part or vice versa ascend. Thus, the distance between the lower guide plate and the connection part may be adjusted to adjust the pressing force applied to the connection part through the lower guide plate.

The electrolyte removing member according to the present invention may comprise the second cylinder and the pressing piece. Thus, the electrolyte remaining on the connection part may be pushed to the gas pocket part and thus removed to improve the sealability of the connection part when the connection part is sealed.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 9:
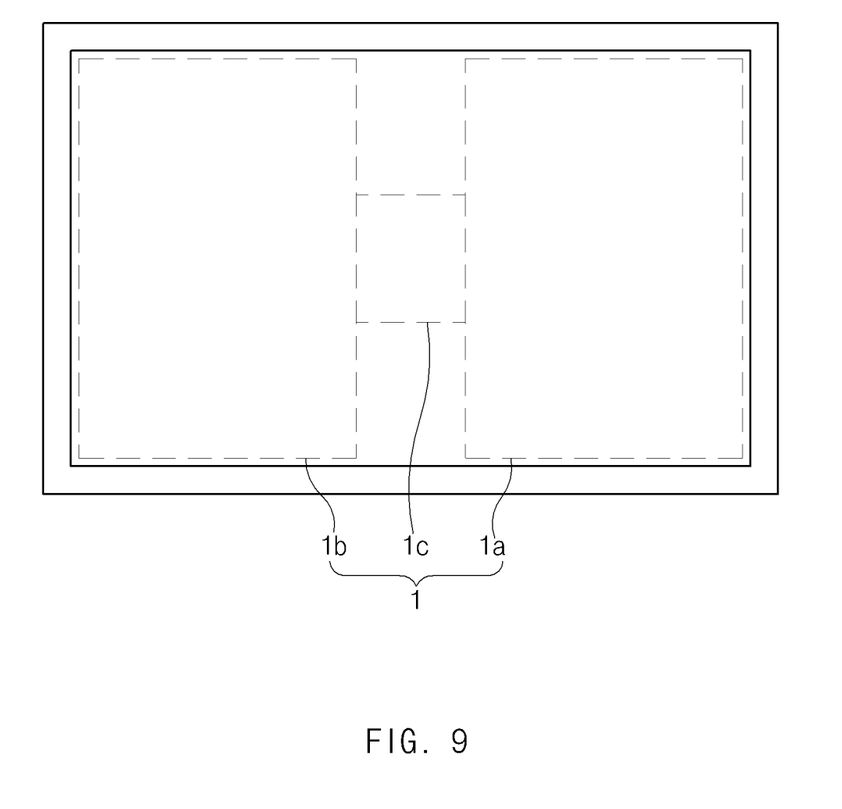
FIG. 9 is a plan view of a secondary battery according to a third embodiment of the present invention.

Referring to FIG. 9, a secondary battery comprises an electrode assembly (not shown), an electrolyte (not shown), and a pouch 1 accommodating the electrode assembly and the electrolyte. The pouch 1 comprises an accommodation part 1a in which the electrode assembly is accommodated, a gas pocket part 1b collecting a gas generated in the accommodation part 1a, and a connection part 1c connecting the accommodation part 1a to the gas pocket part 1b so that the gas generated in the accommodation part 1a is collected in the gas pocket part 1b.

In the secondary battery, while the gas generated in the accommodation part 1a moves to the gas pocket part 1b, a portion of the electrolyte contained in the gas may remain on the connection part 1c, and thus, the connection part 1c may not be completely sealed by the electrolyte remaining on the connection part 1c to cause sealing defects.

To solve above problem, the prevent invention may comprise an electrolyte removing device 20 that pushes the electrolyte remaining on the connection part 1c of the pouch 1 toward the gas pocket part 1b to remove the electrolyte. Thus, since the electrolyte does not remain on the connection part 1c of the pouch 1, the connection part 1c may be completely sealed to prevent sealing defects from occurring.

Hereinafter, a method for removing an electrolyte according to a first embodiment of the present invention will be described.

Figure 1:
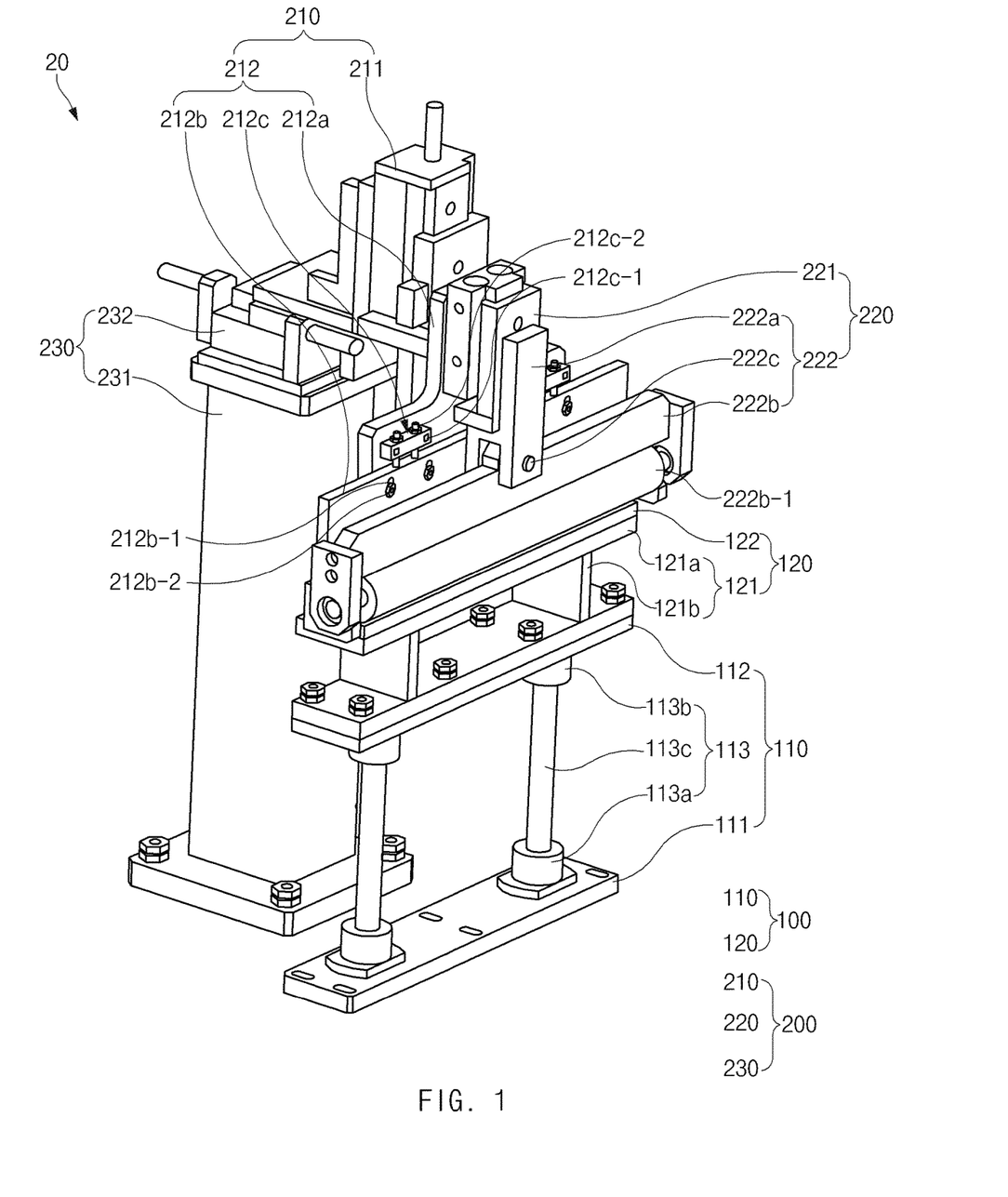
FIG. 1 is a perspective view of an electrolyte removing device according to a first embodiment of the present invention.
Figure 2:
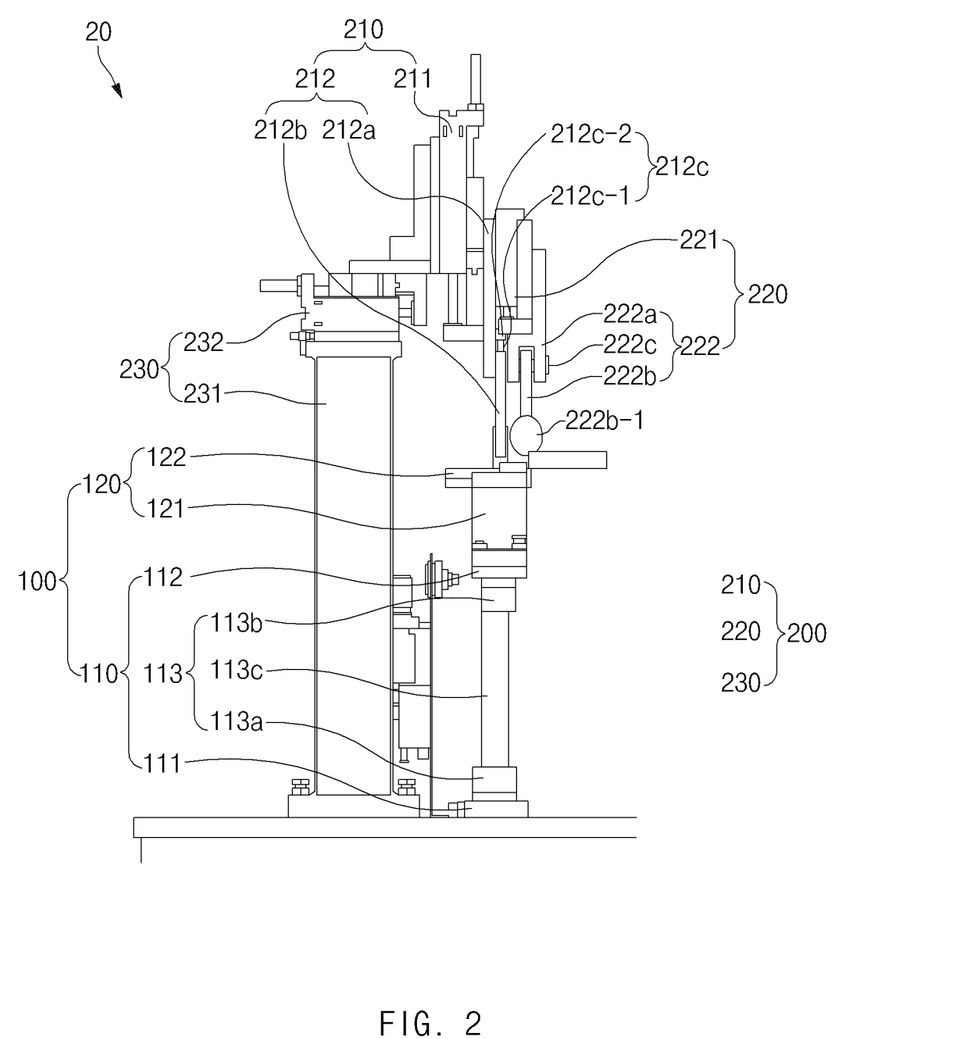
FIG. 2 is a side view of the electrolyte removing device according to the first embodiment of the present invention.
Figure 3:
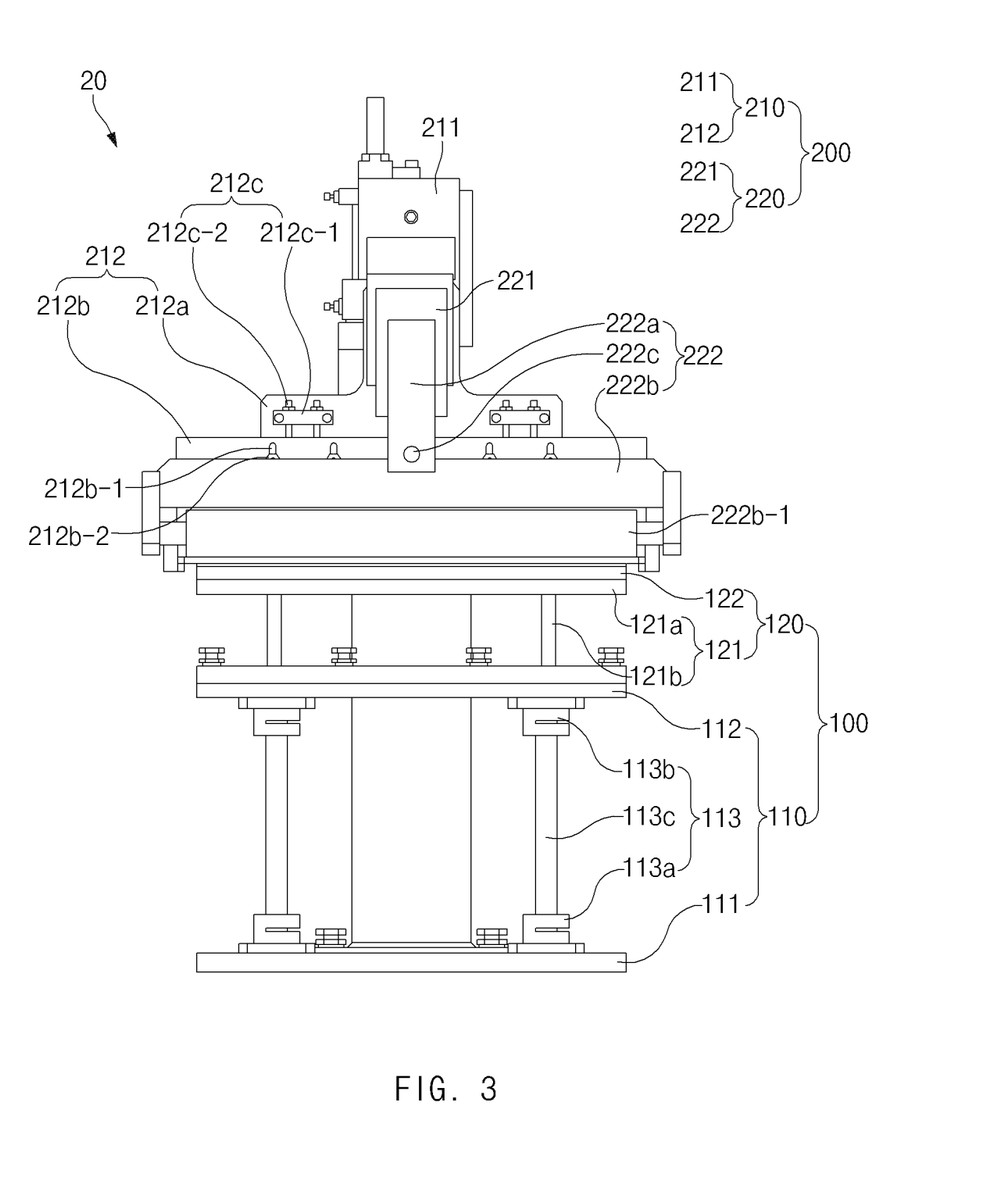
FIG. 3 is a front view of the electrolyte removing device according to the first embodiment of the present invention.

Electrolyte Removing Device According to First Embodiment of the Present Invention As illustrated in FIGS. 1 to 3, an electrolyte removing device 20 according to a first embodiment of the present invention comprises a jig assembly 100 on which a pouch 1 seated and an electrolyte removing assembly 200 removing an electrolyte remaining on a connection part 1c of a pouch 1 seated on the jig assembly 100.

Jig Assembly

The jig assembly 100 is configured to seat the pouch 1 thereon. The jig assembly 100 comprises a fixing jig 110 fixed to a worktable or a ground and a seating jig 120 which is coupled to a top surface of the fixing jig 110 and on which the pouch 1 is seated.

The fixing jig 110 comprises a lower support plate 111 fixed to the worktable or the ground, an upper support plate 112 which is disposed above the lower support plate 111 and to which the seating jig 120 is coupled, and a height-adjusting part 113 disposed between the lower support plate 111 and the upper support plate 112 to adjust a distance between the lower support plate 111 and the upper support plate 112.

The upper support plate 111 and the upper support plate 112 have rectangular shapes having the same size. However, the lower support plate 111 may have a thickness greater than that of the upper support plate 112. This is done because a load acting on the lower support plate 111 is greater than that acting on the upper support plate 112. Thus, the lower support plate 111 may have a thickness greater than that of the upper support plate 112 to achieve stable fixing force.

For example, the lower support plate 111 may have a thickness of 11 mm to 20 mm, and the upper support plate 112 may have a thickness of 5 mm to 10 mm.

The lower support plate 111 may be made of a material having strength greater than that of the upper support plate 112.

Figure 4:
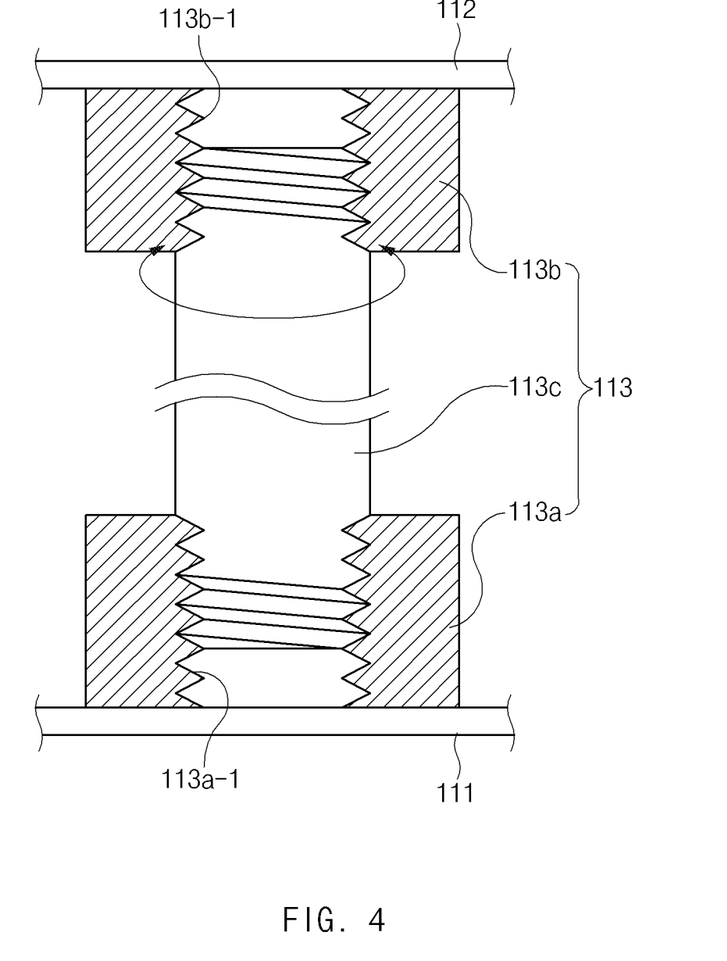
FIG. 4 is a cross-sectional view illustrating a fixing jig of the electrolyte removing device according to the first embodiment of the present invention.

Here, as illustrated in FIG. 4, the height-adjusting part 113 comprises a lower adjusting piece 113a disposed on the lower support plate 111 and having a first screw hole 113a-1, an upper adjusting piece 113b disposed on the upper support plate 112 to correspond to the lower adjusting piece 113a and having a second screw hole 113b-1 corresponding to the first screw hole 113a-1, wherein a screw thread formed in the second screw hole 113b-1 is threaded in a direction opposite to a screw thread formed in the first screw hole 113a-1, and an adjusting rod 113c disposed between the lower support plate 111 and the upper support plate 112 and coupled to each of the first screw hole 113a-1 of the lower adjusting piece 113a and the second screw hole 113b-1 of the upper adjusting piece 113b.

That is, in the height-adjusting part 113, when the adjusting rod 113c rotates in a left or right direction, the lower adjusting piece 113a and the upper adjusting piece 113b, which are respectively coupled to both ends of the adjusting rod 113c, move in directions corresponding to each other or in opposite directions. Thus, the distance between the lower support plate 111 and the upper support plate 112 may be adjusted, and thus, a distance between the jig assembly 100 and the electrolyte removing member of the electrolyte removing assembly may be simply adjusted.

The seating jig 120 comprises a fixing piece 121 coupled to a top surface of the upper support plate 112 of the fixing jig 110 and a seating piece 122 having elastic restoring force, which is disposed on a top surface of the fixing piece 121 and on which the pouch 1 is seated.

Here, the fixing piece 121 comprises a pair of horizontal plates 121a disposed in a vertical direction and a pair of vertical plates 121b disposed between the pair of horizontal plates 121a to connect the pair of horizontal plates 121a to each other.

That is, in the fixing piece 121, the pair of horizontal plates 121a and the pair of vertical plates 121b may have a "n" shape. As a result, stable supporting force may be achieved while minimizing material costs.

The seating piece 122 may be made of a synthetic resin material and be attached to the top surface of the fixing piece 121 through an adhesive.

Here, the seating piece 122 may be disposed to surround an edge of the horizontal plate 121a, which is disposed at an upper side, of the pair of horizontal plates 121a to prevent the pouch 1 from being damaged by the horizontal plate 121a.

The jig assembly 100 having the above-described configuration may comprise the fixing jig 110 and the seating jig 120 to stably seat the pouch 1 thereon.

Electrolyte Removing Assembly

Referring to FIGS. 2 and 3, the electrolyte removing assembly 200 is configured to push the electrolyte remaining on the connection part of the pouch seated on the jig assembly to the gas pocket part, thereby removing the electrolyte. The electrolyte removing assembly 200 comprises a guide member 210 guiding the connection part 1c to be spread while moving to the gas pocket part 1b in a state of pressing the connection part 1c, an electrolyte removing member 220 pushing the electrolyte remaining on the connection part 1c to the gas pocket part 1b to remove the electrolyte while moving to the gas pocket part 1b in a state of pressing the connection part 1c spread by the guide member 210, and a moving member 230 allowing the guide member 210 and the electrolyte removing member 220 to move from the connection part 1c to the gas pocket part 1b.

The guide member 210 is configured to flatly spread the connection part of the pouch seated on the jig assembly 100. That is, when the connection part 1c is pressed through the electrolyte removing member 220 in a state in which the connection part 1c is wrinkled or bent, the wrinkled or bent portion of the connection part 1c may be folded to cause defects. Particularly, the electrolyte may remain on the folded portion, and thus, the electrolyte remaining on the connection part 1c may not be completely removed.

Thus, the guide member 210 may flatly spread the connection part of the pouch to prevent the connection part from being wrinkled or bent so that the electrolyte remaining on the connection part 1c is completely removed.

For example, the guide member 210 comprises a first cylinder 211 moving from the connection part 1c to the gas pocket part 1b by a movable cylinder of the moving member 230 and a guide part 212 pressing the connection part 1c while descending toward the connection part 1c by the first cylinder 211 and spreading the connection part 1c without being folded while being interlocked with the first cylinder 211 to move from the connection part 1c to the gas pocket part 1b.

That is, the guide member 210 may press one end of the connection part 1c connected to the accommodation part 1a while the guide part 212 descends by the first cylinder 211. Thus, the wrinkled or bent portion of the one end of the connection part 1c may be flatly spread. Also, in this state, the first cylinder 211 may move from the connection part 1c to the gas pocket part 1b by the movable cylinder. Thus, the guide part 212 may be interlocked with the first cylinder 211 to move up to the other end of the connection part 1c connected to the gas pocket part 1b to flatly spread the entire connection part 1c.

Particularly, the guide member 210 may press the pouch 1 seated on the jig assembly 100 to fix the pouch 1 without moving. Thus, the pouch 1 may be fixed to the jig assembly 100 without using a separate fixing unit.

Figure 5:
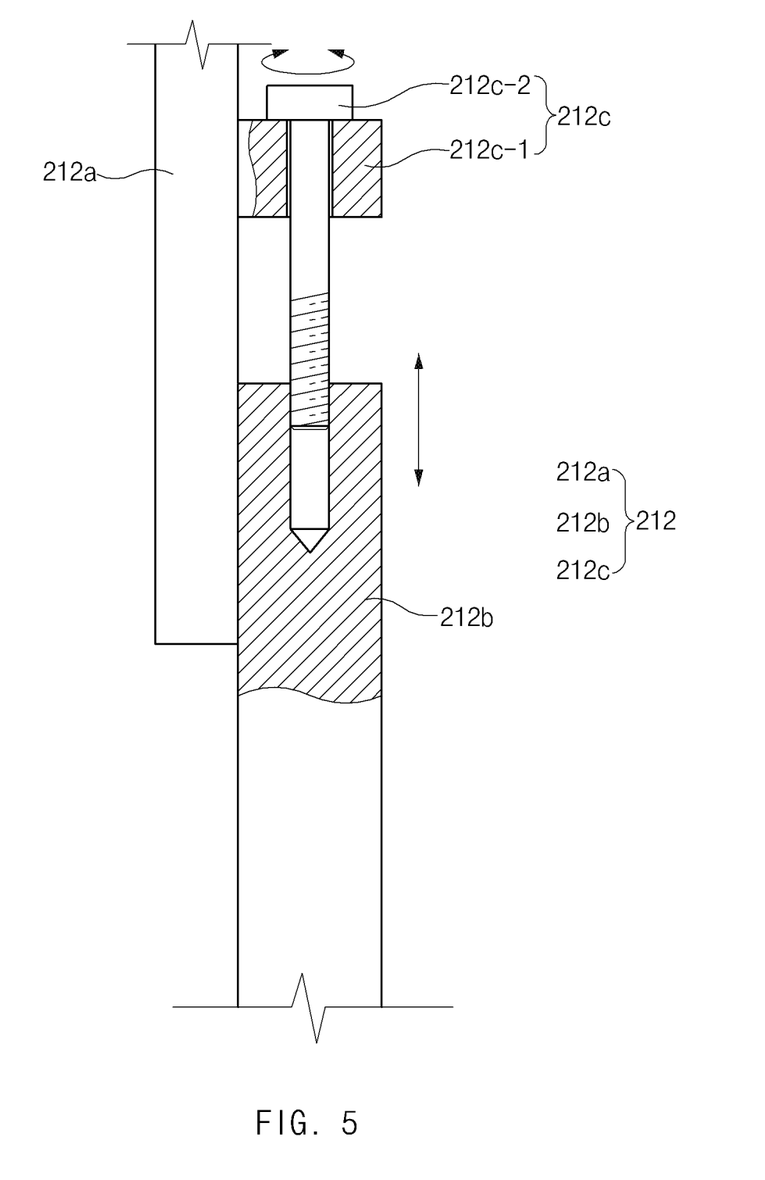
FIG. 5 is a cross-sectional view illustrating a coupling part of the electrolyte removing device according to the first embodiment of the present invention.

As illustrated in FIG. 5, the guide part 212 has a structure that is easily maintained and repaired and is adjustable in length. That is, the guide part 212 comprises an upper guide plate 212a descending by the first cylinder 211, a lower guide plate 212b coming into surface contact with the connection part 1c to spread the connection part 1c without being folded, and a coupling part 212c coupled to the lower guide plate 212b and the upper guide plate 212a.

Here, an upper portion of the lower guide plate 212b may be closely attached to a lower portion of the upper guide plate 212a while overlapping the lower portion of the upper guide plate 212a. Thus, coupling force between the lower guide plate 212b and the upper guide plate 212a may increase.

Particularly, referring to FIG. 1, a long hole 212b-1 is defined in the lower guide plate 121b overlapping the upper guide plate 212a in the direction of the connection part 1c. Also, a coupling bolt 212b-2 coupled to the upper guide plate 212a by passing through the long hole 212b-1 to couple the upper guide plate 121a to the lower guide plate 212b is provided. That is, the upper guide plate 212a and the lower guide plate 121b, which overlap each other through the long hole 212b-1 and the coupling bolt 212b-2, may be firmly fixed to each other. Each of the upper guide plate 121a and the lower guide plate 212b may be adjusted in position within a range of the long hole 212b-1 to adjust a length of the guide part 212.

As illustrated in FIG. 5, the coupling part 212c has a structure that easily adjusts a length of each of the upper guide plate 121a and the lower guide plate 212b. That is, the coupling part 212c comprises a fixing piece 212c-1 disposed on the upper guide plate 212a and a fixing bolt 212c-2 passing through the fixing piece 212c-1 and coupled to the lower guide plate 212b. In the coupling part 212c having the above-described structure, the fixing blot is loosened or tightened so that the lower guide plate 212b descends toward the connection part 1c or vice versa ascends. Thus, the length of each of the upper guide plate 121a and the lower guide plate 212b may be easily adjusted, and thus, a distance between the connection part 1c and the lower guide plate 212b may be easily adjusted.

The guide member 210 having the above-described configuration may fix the connection part 1c and also flatly spread the connection part 1c so that the electrolyte remaining on the connection part of the pouch seated on the jig assembly 100 is completely removed.

The electrolyte removing member 220 is configured to remove the electrolyte remaining on the connection part. The electrolyte removing member 220 comprises a second cylinder 221 interlocked with the guide member 210 to move from the connection part 1c to the gas pocket part 1b and a pressing piece 222 pressing the connection part 1c while descending toward the connection part 1c by the second cylinder 221 and pushing the electrolyte remaining on the connection part 1c to the gas pocket part 1b while being interlocked with the second cylinder 221 to move from the connection part 1c to the gas pocket part 1b, thereby removing the electrolyte.

That is, the electrolyte removing member 220 may press one end of the connection part 1c while descending by the second cylinder 221. In this state, the electrolyte removing member 220 may push the electrolyte remaining on the connection part 1c to allow the electrolyte to move to the gas pocket part 1b while being interlocked with the second cylinder 221 to move from the connection part 1c to the gas pocket part 1b. Thus, the electrolyte remaining on the connection part 1c may be completely removed.

Figure 6:
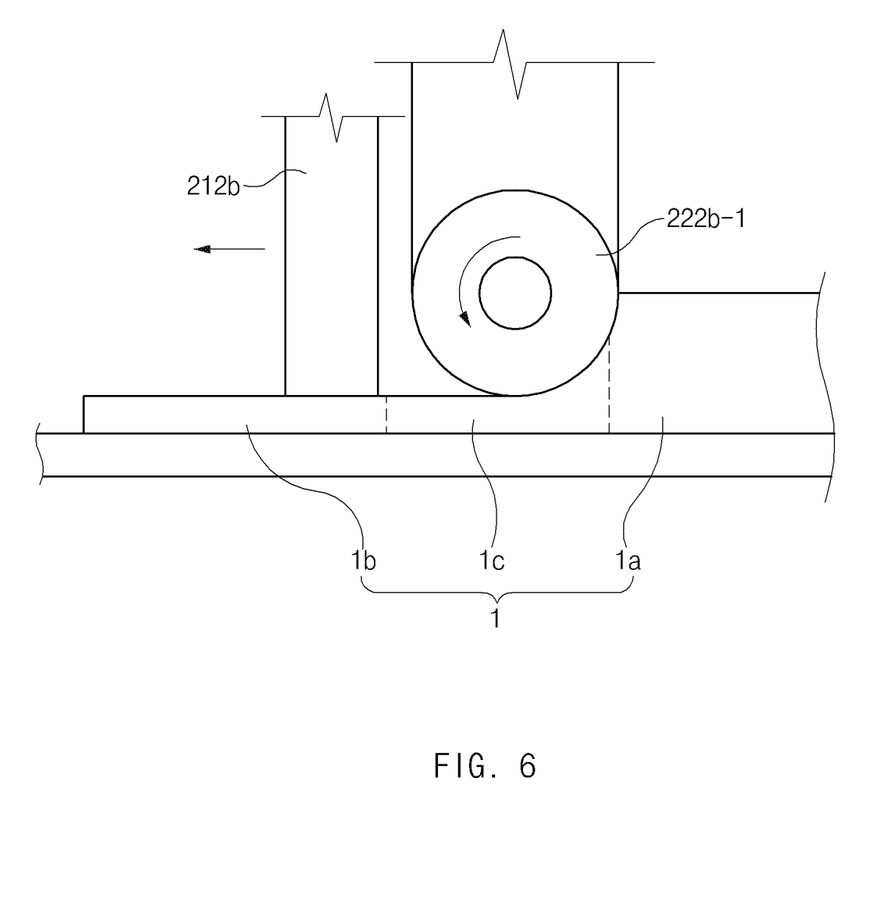
FIG. 6 is a schematic side view illustrating an operation state of the electrolyte removing device according to the first embodiment of the present invention.

Here, as illustrated in FIG. 6, the pressing piece 222 may comprise a pressing part 222a descending by the second cylinder 221, a roller part 222b comprising a pressing roller 222b-1 coming into rolling contact with the connection part, and a hinge shaft 222c coupling the roller part 222b to the pressing part 222a. Thus, the pressing piece 222 may come into rolling contact with the connection part 1c to completely remove the electrolyte remaining on the connection part 1c. Particularly, the roller part 222b may rotate around the hinge shaft 222c. Thus, the roller part 222b may come into surface contact with the surface of the connection part 1c while rotating around the hinge shaft 222c, and thus, the electrolyte remaining on the connection part 1c may be completely removed.

The electrolyte removing member 220 having the above-described configuration may push the electrolyte remaining on the connection part to the gas pocket part to completely remove the electrolyte.

The moving member 230 is configured to allow the guide member and the electrolyte removing member to move from the connection part to the gas pocket part. The moving member 230 comprises a fixed body 231 and a movable cylinder 232 coupled to the fixed body 231 to allow the guide member 210 and the electrolyte removing member 220 to move from the connection part 1c to the gas pocket part 1b. That is, the moving member 230 is interlocked with the movable cylinder 232 to allow the guide member 210 to move while the guide member 210 is coupled to the movable cylinder 232 of the moving member 230. Also, while the electrolyte removing member 210 is coupled to the first cylinder 211 of the guide member 210, the movable cylinder 232 and the first cylinder 211 are interlocked with each other to allow the electrolyte removing member 220 to move.

Each of the movable cylinder 232, the first cylinder 211, and the second cylinder 221 may be a pneumatic cylinder that is easy to be used.

Thus, the electrolyte removing device 20 according to the first embodiment of the present invention may comprise the guide member 210, the electrolyte removing member 220, and the moving member 230 to push the electrolyte remaining on the connection part 1c of the pouch 1 to the gas pocket part 1b and thereby to completely remove the electrolyte. Thus, when the connection part 1c is sealed, the connection part 1c may be completely sealed to prevent sealing defects from occurring.

Hereinafter, an electrolyte removing method using the electrode removing device according to the first embodiment of the present invention will be described.

Electrolyte Removing Method According to First Embodiment of the Present Invention An electrolyte removing method according to the first embodiment of the present invention comprises a step of preparing a pouch 1 in which an electrode assembly is accommodated, a step of seating the pouch 1 on a jig assembly 100, and a step of pushing an electrolyte remaining on a connection part 1c of the pouch 1 seated on the jig assembly 100 to a gas pocket part 1b through an electrolyte removing assembly 200 to remove the electrolyte.

In the step of preparing the pouch, the pouch 1 comprising an accommodation part 1a in which the electrode assembly is accommodated, a gas pocket part 1b collecting a gas generated in the accommodation part 1a, and a connection part 1c connecting the accommodation part 1a to the gas pocket part 1b so that the gas generated in the accommodation part 1a moves to the gas pocket part 1b is prepared.

In the step of seating the pouch 1, the pouch 1 is seated on a seating piece of a seating jig 120 provided in the jig assembly 100.

The step of removing the electrolyte comprises a first process of flatly spreading the connection part of the pouch and a second process of removing the electrolyte of the connection part that is flatly spread.

In the first process, the guide part 212 descends through a first cylinder 211 of a guide member 210 to press one end of the connection part 1c connected to the accommodation part 1a. Thus, the connection part 1c may be fixed, and also, a wrinkled or bent portion formed on the connection part 1c may be flatly spread. Here, when pressing force of the guide part 212, which is applied to the connection part 1c, is small or large, the guide part 212 may adjust a position of each of an upper guide plate 212a and a lower guide plate 212b by using a coupling part 212c. Thus, the guide part 212 may be adjusted in length to adjust the pressing force of the guide part 212, which is applied to the connection part 1c.

That is, the guide part 212 may descend toward the connection part or vice versa ascend by loosing or tightening a fixing bolt 212c-2 of the coupling part 212c. Thus, a distance between the connection part and the guide part may be adjusted to adjust the pressing force when the guide part 212 descends.

Here, the upper guide plate 212a and the lower guide plate 212b may be closely attached to overlap each other. Thus, coupling force between the upper guide plate 212a and the lower guide plate 212b may increase.

Particularly, in the upper guide plate 212a and the lower guide plate 212b, a length of each of the upper guide plate 212a and the lower guide plate 212b may be prevented from being significantly adjusted through a long hole 212b-1 formed in the lower guide plate 212b and a coupling bolt 212b-2 passing through the long hole 212b-1 and coupled to the upper guide plate 212a.

In the second process, a pressing part 222a descends through a second cylinder 221 of an electrolyte removing member 220 to press the one end of the connection part 1c. In this state, the first and second cylinders 211 and 221 may move to the gas pocket part 1b by the movable cylinder 232 of the moving member 230, and the pressing part 222a may be interlocked with the first and second cylinders 211 and 221 to move to the gas pocket part 1b and thereby to push the electrolyte remaining on the connection part 1c to the gas pocket part 1b, thereby removing the electrolyte.

Hereinafter, in descriptions of another embodiment of the present invention, constituents having the same configuration and function as the abovementioned embodiment have

Figure 7:
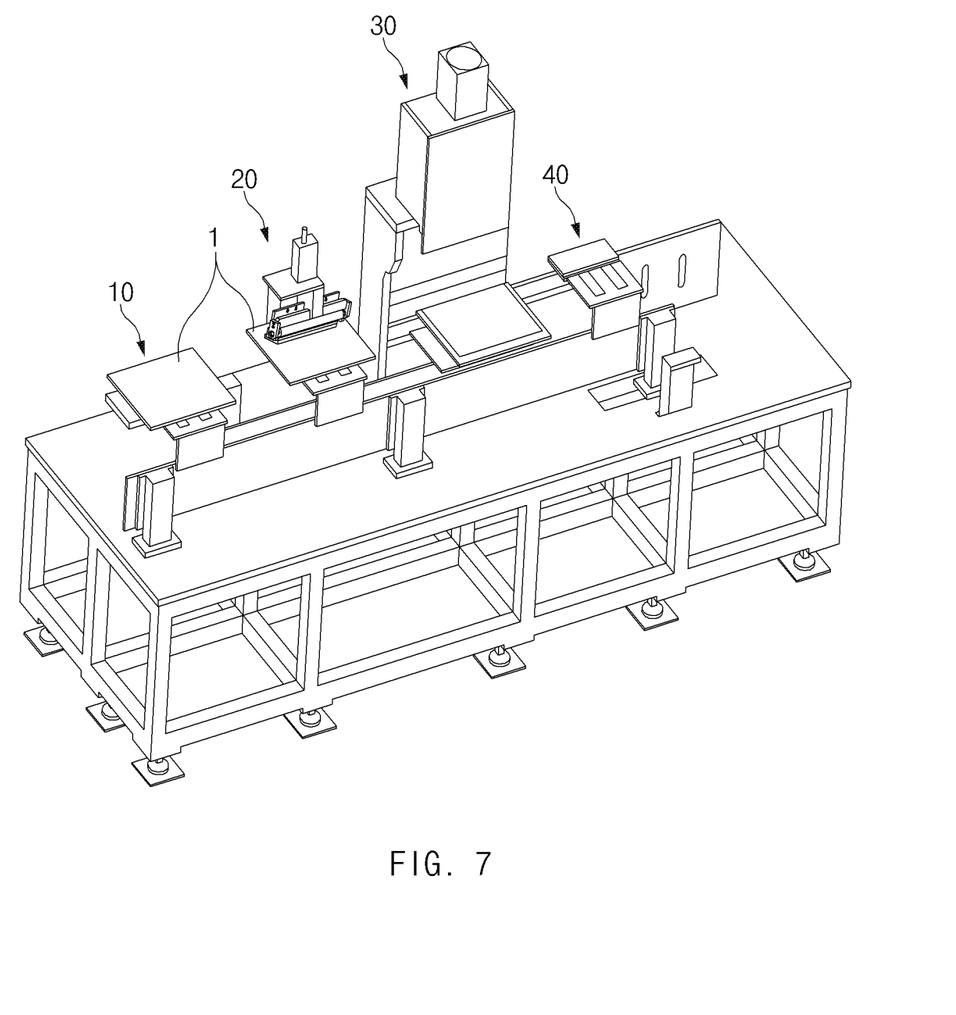
FIG. 7 is a perspective view illustrating an apparatus for manufacturing a secondary battery according to a second embodiment of the present invention.

Apparatus for Manufacturing Secondary Battery According to Second Embodiment of the Present Invention As illustrated in FIG. 7, an apparatus for manufacturing a secondary battery according to a second embodiment comprises a transfer device 10 transferring a pouch 1, an electrolyte removing device 20 pushing an electrolyte remaining on a connection part 1*c* of the pouch 1, which is transferred by the transfer device 10, to a gas pocket part 1*b* to remove the electrolyte, a sealing device 30 sealing the connection part 1*c* of the pouch 1, from which the electrolyte is removed by the electrolyte removing device 20, and a discharge device 40 discharging the pouch 1 in which the connection part 1*c* is sealed by the sealing device 30.

Here, since the electrolyte removing device 20 has the same configuration and function as the electrolyte removing device according to the foregoing first embodiment, its detailed description will be omitted.

Thus, in the apparatus for manufacturing the secondary battery according to the second embodiment of the present invention, an electrolyte remaining on a connection part 1*c* of the pouch 1 may be completely removed to completely seal the connection part 1*c*. Thus, sealing defects may be prevented from occurring to manufacture a high-quality secondary battery.

Hereinafter, a method for manufacturing the secondary battery according to the second embodiment of the present invention will be described.

Figure 8:
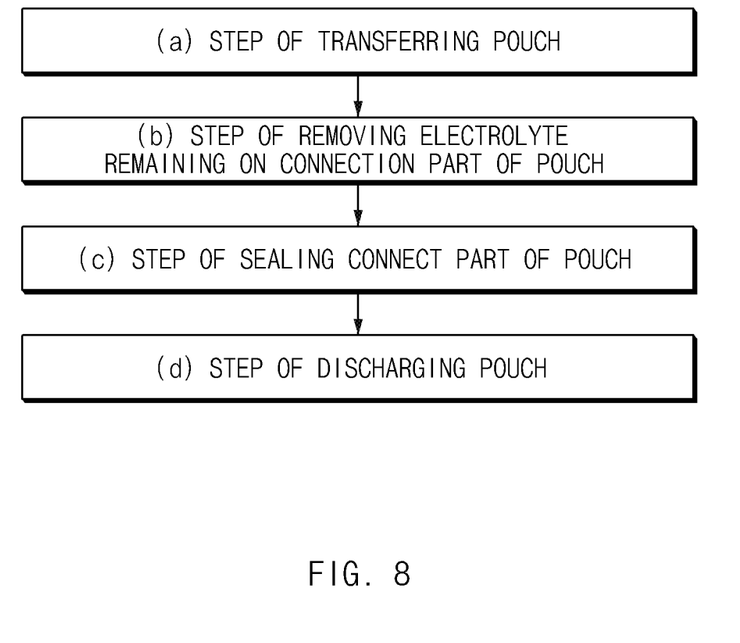
FIG. 8 is a flowchart illustrating a method for manufacturing the second battery according to the second embodiment of the present invention.

Method for Manufacturing Secondary Battery According to Second Embodiment of the Present Invention As illustrated in FIG. 8, a method for manufacturing the secondary battery according to the second embodiment of the present invention comprises: a step (a) of transferring a pouch comprising an accommodation part in which an electrode assembly is accommodated, a gas pocket part, and a connection part connecting the accommodation part to the gas pocket part; a step (b) comprising a first process of seating the transferred pouch and a second process of pushing an electrolyte remaining on the connection part of the pouch to the gas pocket part to remove the electrolyte; a step (c) of sealing the connection part of the pouch, from which the electrolyte is removed; and a step (d) of discharging the pouch in which the connection part is sealed.

The step (b) is the same as that in the electrolyte removing method according to the foregoing first embodiment of the present invention, and thus, its detailed description will be omitted.

However, in the second process, the connection part may be spread without being folded while moving to the gas pocket part in a state of being pressed. Then, the electrolyte remaining on the connection part may be pushed to the gas pocket part and then removed while the connection part moves to the gas pocket part in the state of being pressed.

Thus, in the method for manufacturing the secondary battery according to the second embodiment of the present invention, the electrolyte remaining on the connection part 1*c* of the pouch 1 may be completely removed to improve sealability of the connection part 1*c*, thereby significantly preventing defects from occurring.

Secondary Battery According to Third Embodiment of the Present Invention

As illustrated in FIG. 9, a secondary battery according to a third embodiment of the present invention comprises a pouch 1 comprising an accommodation part 1*a* in which an electrode assembly (not shown) is accommodated, a gas pocket part 1*b*, and a connection part 1*c* connecting the accommodation part 1*a* to the gas pocket part 1*b*. Here, an electrolyte remaining on the connection part 1*c* of the pouch 1 may be removed by an electrolyte removing device 20 and thus may not remain on the connection part 1*c*.

Here, the electrolyte removing device 20 has the same configuration and function as the electrolyte removing device according to the foregoing first embodiment, and thus, its detailed description will be omitted.

Thus, in the secondary battery according to the third embodiment of the present invention, the electrolyte remaining on the connection part 1*c* of the pouch 1 may be completely removed by using the electrode removing device 20. Thus, the secondary battery comprising the pouch 1 in which the electrolyte does not remain on the connection part 1*c* may be manufactured.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrolyte removing device comprising:
   a jig assembly configured to receive in a seated position a pouch comprising an accommodation part in which an electrode assembly is accommodated, a gas pocket part, and a connection part connecting the accommodation part to the gas pocket part, the jig assembly comprising a fixing jig and a seating jig coupled to a top surface of the fixing jig, the seating jig configured to receive the pouch in the seated position, the seating jig comprising a fixing piece coupled to the top surface of the fixing jig and a seating piece having elastic restoring force, the seating piece disposed on a top surface of the fixing piece; and
   an electrolyte removing assembly configured to push an electrolyte remaining on the connection part to the gas pocket part to remove the electrolyte from the connection part,
   wherein the electrolyte removing assembly comprises:
   a guide member configured to flatten the connection part without being folded while the guide member is moved to the gas pocket part in a state of pressing the connection part;
   an electrolyte removing member configured to push the electrolyte remaining on the connection part to the gas pocket part to remove the electrolyte from the connection part while the electrolyte removing member is moved to the gas pocket part in a state of pressing the connection part that is flattened by the guide member; and
   a moving member configured to move the guide member and the electrolyte removing member from the connection part to the gas pocket part.

2. The electrolyte removing device of claim 1, wherein the moving member comprises:
   a fixed body; and
   a movable cylinder coupled to the fixed body, the movable cylinder configured to horizontally translate the guide member and the electrolyte removing member from the connection part to the gas pocket part.

3. The electrolyte removing device of claim 2, wherein the guide member comprises:
a first cylinder configured to horizontally translate from the connection part to the gas pocket part due to motion of the movable cylinder; and
a guide part configured to press on the connection part, the first cylinder configured to vertically translate the guide part into contact with the connection part, the movable cylinder configured to horizontally translate the guide part and the first cylinder together from the connection part to the gas pocket part to flatten the connection part.

4. The electrolyte removing device of claim 3, wherein the guide part comprises:
an upper guide plate coupled to the first cylinder;
a lower guide plate configured to vertically translate relative to the upper guide plate to come into surface contact with the connection part to flatten the connection part without being folded; and
a coupling part coupled to the lower guide plate and the upper guide plate.

5. The electrolyte removing device of claim 4, wherein an upper portion of the lower guide plate is configured to overlap a lower portion of the upper guide plate.

6. The electrolyte removing device of claim 5, wherein an oblong vertical hole is defined in the lower guide plate, the oblong vertical hole overlapping the upper guide, and
a coupling bolt passing through the oblong vertical hole and coupled to the upper guide plate so that the upper guide plate and the lower guide plate are coupled to each other.

7. The electrolyte removing device of claim 5, wherein the coupling part comprises:
a fixing piece provided on the upper guide plate; and
a fixing bolt passing through the fixing piece and coupled to the lower guide plate,
wherein the lower guide plate is configured to vertically descend or ascend by respectively loosening or tightening the fixing bolt to adjust a vertical distance between the connection part and the lower guide plate.

8. The electrolyte removing device of claim 2, wherein the electrolyte removing member comprises:
a second cylinder coupled to the guide member, the second cylinder configured to horizontally translate from the connection part to the gas pocket part due to motion of the movable cylinder; and
a pressing piece configured to press on the connection part, the second cylinder configured to vertically translate the pressing piece into contact with the connection part, the movable cylinder configured to horizontally translate the pressing piece and the second cylinder together to push the electrolyte remaining on the connection part to the gas pocket part, thereby removing the electrolyte from the connection part.

9. The electrolyte removing device of claim 8, wherein the pressing piece comprises:
a pressing part coupled to the second cylinder;
a roller part comprising a pressing roller rotationally coupled to the pressing part and configured to come into rolling contact with the connection part; and
a hinge shaft coupling the roller part to the pressing part, wherein the roller part is configured to rotate around the hinge shaft.

10. The electrolyte removing device of claim 1, wherein the fixing jig comprises:
a lower support plate;
an upper support plate which is disposed above the lower support plate and to which the seating jig is coupled; and
a height-adjusting part disposed between the lower support plate and the upper support plate, the height-adjusting part being configured to adjust a distance between the lower support plate and the upper support plate.

* * * * *